Aug. 18, 1959     L. E. ASKE     2,900,471
MAGNETIC SWITCH
Filed April 26, 1957

INVENTOR.
LEONARD E. ASKE
BY
ATTORNEY

United States Patent Office 2,900,471
Patented Aug. 18, 1959

2,900,471
MAGNETIC SWITCH

Leonard E. Aske, Minneapolis, Minn., assignor to Minneapolis-Honeywell Regulator Company, Minneapolis, Minn., a corporation of Delaware Application April 26, 1957, Serial No. 655,268

5 Claims. (Cl. 200—87)

This invention relates to switches, and more particularly to rotary magnetic switches for use as a sector switch on a gyroscope, although it is not to be inferred that the invention is limited to use in a gyroscope.

A gyroscope, being a delicate instrument, is very sensitive to forces exerted in opposition to the rotation of its gimbal. It is common to have sector switches, used in conjunction with gyroscopic gimbals, to give signals at predetermined positions of gimbal rotation. In the past, sector switches have been used wherein a wiper arm is attached to one of a pair of relatively rotatable members and an insulative surface, having switch contacts embedded therein, is attached to the other rotatable member. The wiper then presses against the surface of the insulator and when a predetermined relative rotation has occurred, presses against one of the switch contacts to complete an electrical circuit. One source of error encountered in such systems is the retarding force applied to the gimbal by the friction between the wiper and the insulating surface on which it travels. Such friction may be minimized by decreasing the force with which the wiper pushes against the surface but the wiper then makes poor contact when it touches the embedded switch contacts.

It is therefore an object of my invention to eliminate the frictional drag of a wiper on a surface and yet provide suitable contact pressure at the desired positions.

Another object of my invention is to provide a novel switch which is operated at predetermined positions through the action of magnetic force on the wiper.

Figure 1:
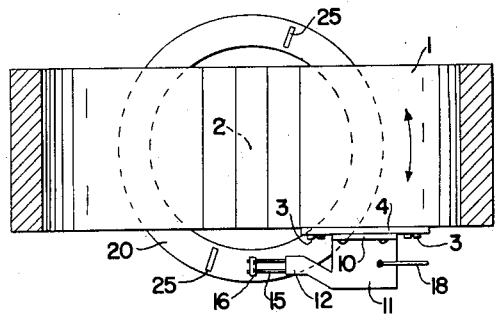
Figure 2:
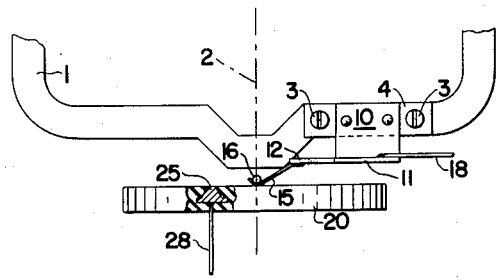
Figure 3:
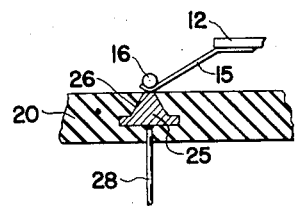

Other objects and uses will become apparent from a reading of the following description and drawings in which:

Figure 1 is a front view of a section of a gyroscope gimbal having the switch incorporated thereon;
Figure 2 is a side elevation of Figure 1;
Figure 3 is an enlarged detail of the wiper and sector contact.

Referring to figures, numeral 1 indicates a gimbal of a gyroscope having an axis of rotation 2. Attached to one side of the gimbal by means of screws 3 is an insulating plate 4. Secured to plate 4 and electrically insulated from the gimbal 1 is a lateral extension 10 of a wiper arm 11. The wiper arm 11 has an extension 12 to which wipers 15 are attached. Fixed to wipers 15 is a piece of iron or other magnetic material 16, or if desired, the wiper itself may be made of magnetic material. Attached to wiper 11, by some method such as soldering, is a conductor 18 leading from a source of current (not shown). An annular ring or drum 20 of some insulating material such as plastic, having an axis colinear with axis 2 and having an average radius equal to the distance from axis 2 to wipers 15, is fixed to a base member, not shown, so that there may be relative rotation between the gimbal 1 and ring 20. Obviously whether the ring rotates or whether the gimbal rotates depends upon whether the gyroscope is observed with respect to the base or with respect to a point in space. Wipers 15 are so adjusted that they just barely touch or just barely miss touching the surface of ring 20. Thus there is little frictional drag on the gimbal 1 rotating relative to ring 20 and yet excess vibration of the wiper is avoided. Embedded within ring 20 at predetermined points are small magnets 25. As best seen in Figure 3, each of said magnets 25 has a pyramidal portion 26 extending towards the surface of the plastic ring 20 in such a manner that it breaks the surface of the ring 20 so that a surface of the magnet lies exposed. Attached to each of said magnets 25 is a lead wire 28 used in conjunction with wire 18 to complete a circuit. Each of the magnets 25 is adapted to cooperate with magnetic piece 16 when gimbal 1 causes wiper 15 to approach one of the magnets 25. It is seen that the direction of travel of the wiper 15 relative to the magnets 25 is substantially parallel to the exposed surfaces of the magnets 25. When said wiper 15 is sufficiently close to one of said magnets 25, the attractive force pulls the wiper into contact with the magnet thereby providing sufficient pressure for good contact.

In operation, the action of the gyroscope causes gimbal 1 to rotate relative to ring 20. Wipers 15 travel frictionlessly over the surface of ring 20 until the magnetic material 16 approaches one of the magnets 25 at which time the wipers 15 are pressed against the pyramidal extension 26 of the magnet where it breaks the surface of ring 20. An electric circuit is then completed from wire 18 through arm 11, extension 12 and wipers 15, through the magnet to wire 28. The force of each of the magnets 25 acting on iron piece 16 is sufficient to cause good contact between the wipers 15 and the exposed portion of the magnet. Upon further or reverse rotation of gimbal 1, the wipers 15 leave the magnet 25 and again assume the position on or nearly touching the surface of ring 20 thereby causing negligible friction adverse to rotation of the gimbal 1. The magnets, of course, may be coated with suitable material such as gold or silver to insure good electrical contact and durability.

Obviously the relative location of the magnet and the armature could be reversed, or two magnets could be used to effect the same result.

Having now described my invention, it is obvious that many variations and numerous uses may be applied without departing from the spirit of the invention. I do not wish to limit myself to the exact configurations, combinations, forms or arrangements described herein and I wish only to be limited to the following claims.

I claim:
1. In a magnetic switch, a first member, a ring mounted for rotation relative to said first member, a plurality of magnets embedded in said ring, said magnets having portions exposed on the surface of said ring, a wiper arm mounted on said first member in such a manner as to be contiguous with said surface, a piece of magnetic material carried by said wiper, attraction between said magnets and said magnetic material causing said wiper to contact said magnets selectively when said ring has rotated to predetermined positions relative to said first member, and means electrically connected to said magnets and said wiper so that circuits are closed when said wiper contacts said magnets.
2. In a magnetic switch, a base, a magnet mounted on said base, a contact at least a part of which is magnetic material mounted on said base for relative motion with respect to said magnet in a direction transverse to the effective direction of action of said magnet, an electrical circuit connected between said magnet and said contact, the attractive force between said magnet and said contact when adjacent causing said contact and said magnet to touch thereby closing an electrical circuit, and resilient means connected to said contact for urging said contact away from said magnet in a direction parallel to the effective direction of action of said magnet.

3. In a gyroscope sector switch, a base, an annular ring having a surface connected to said base, a plurality of magnets embedded in said ring so that a portion of said magnets extends to said surface of said ring, a gimbal mounted for rotation with respect to said base, a wiper arm mounted on said gimbal and extending to a point contiguous to said ring so that as said gimbal rotates, said wiper travels adjacent to said surface of said ring, a piece of magnetic material attached to said wiper, and an electric circuit connected between each of said magnets and said wiper, the attractive force between one of said magnets and said material causing said wiper to contact said one of said magnets thereby completing said circuit whenever the rotation of said gimbal places said wiper in proximity to one of said magnets.

4. In a magnetic switch, a base, a magnet mounted on said base, a contact mounted for rotation with respect to said base in a direction transverse to the effective direction of action of said magnet, a point of said rotation placing said contact in proximity to said magnet, resilient means connected to said contact urging said contact away from said magnet in a direction parallel to the effective direction of action of said magnet, a piece of magnetic material mounted on said contact, and an electrical circuit connected from said magnet to said contact, the attractive force of said magnet on said material causing said contact to engage said magnet thereby completing said circuit.

5. In a gyroscope, a base, a gimbal mounted for rotation with respect to said base, a magnet mounted on said base, and a contact at least a part of which is magnetic material, said contact mounted on said gimbal and adapted to move near said magnet in a direction transverse to the effective direction of action of said magnet, the attractive force between said contact and said magnet when said contact is near said magnet causing said contact to touch said magnet.

References Cited in the file of this patent
UNITED STATES PATENTS

| | | |
|---|---|---|
| 1,530,936 | Greenwood | Mar. 24, 1925 |
| 1,580,882 | Gent | Apr. 13, 1926 |
| 2,466,055 | Sierer | Apr. 5, 1949 |
| 2,502,159 | Lamb et al. | Mar. 28, 1950 |
| 2,742,537 | Leslie | Apr. 17, 1956 |